US009752352B2

(12) United States Patent
Portegies

(10) Patent No.: US 9,752,352 B2
(45) Date of Patent: Sep. 5, 2017

(54) LOCKING MECHANISM FOR A GALLEY CONTAINER AND GALLEY CONTAINER PROVIDED WITH A LOCKING MECHANISM

(71) Applicant: Driessen Aerospace Group N.V., Alkmaar (NL)

(72) Inventor: Cornelis Petrus Maria Portegies, Nieuwe Niedorp (NL)

(73) Assignee: DRIESSEN AEROSPACE GROUP N.V., Alkmaar (NL)

( * ) Notice: Subject to any disclaimer, the term of this patent is extended or adjusted under 35 U.S.C. 154(b) by 297 days.

(21) Appl. No.: 14/416,141

(22) PCT Filed: Jul. 23, 2013

(86) PCT No.: PCT/NL2013/050549
§ 371 (c)(1),
(2) Date: Jan. 21, 2015

(87) PCT Pub. No.: WO2014/017903
PCT Pub. Date: Jan. 30, 2014

(65) Prior Publication Data
US 2015/0159403 A1  Jun. 11, 2015

(30) Foreign Application Priority Data

Jul. 23, 2012 (NL) .................................... 2009218

(51) Int. Cl.
*E05C 19/00* (2006.01)
*E05B 63/20* (2006.01)
(Continued)

(52) U.S. Cl.
CPC .......... *E05B 63/20* (2013.01); *B64D 11/0007* (2013.01); *B64D 11/04* (2013.01); *E05B 65/44* (2013.01); *Y10T 292/08* (2015.04)

(58) Field of Classification Search
CPC ........ E05C 19/026; E05C 19/06; E05C 19/12; E05C 19/188; E05C 3/34; Y10S 292/04; Y10T 24/45634

(Continued)

(56) References Cited

U.S. PATENT DOCUMENTS 2,752,183 A * 6/1956 Doll .................. C10B 25/12
202/242
4,482,175 A * 11/1984 Sugie .................. E05C 19/022
292/198
(Continued)

FOREIGN PATENT DOCUMENTS

EP  1 350 655 A1  10/2003
EP  2 322 382 A1  5/2011
(Continued)

OTHER PUBLICATIONS

International Search Report, dated Sep. 26, 2013, from corresponding PCT application.

*Primary Examiner* — Mark Williams
(74) *Attorney, Agent, or Firm* — NLO N.V.; Catherine A. Schultz; Minerva Rivero

(57) ABSTRACT

A locking assembly for a galley container includes: a picklock arranged on a first galley container part, a locking mechanism arranged on a second galley container part for engaging the picklock, the first and second galley container parts being moveable towards and away from each other to close and open the galley container, the locking mechanism being moveable between a release position, wherein the picklock is released from the locking mechanism, and a lock position wherein the locking mechanism can engage the picklock to lock the first container part to the second container part, characterized in that a blocking element is provided that in a block position prevents the locking mechanism from moving to the lock position and in an unblock position allows the locking mechanism to move to the lock position. A galley container provided with such a locking assembly is also described.

13 Claims, 4 Drawing Sheets

(51) Int. Cl.
*B64D 11/00* (2006.01)
*B64D 11/04* (2006.01)
*E05B 65/44* (2006.01)

(58) Field of Classification Search
USPC .......................................................... 292/2
See application file for complete search history.

(56) References Cited

U.S. PATENT DOCUMENTS

| | | | | | |
|---|---|---|---|---|---|
| 4,836,707 | A | * | 6/1989 | Myers | B25B 5/08 |
| | | | | | 24/635 |
| 5,984,381 | A | * | 11/1999 | Yamagishi | E05C 19/022 |
| | | | | | 267/158 |
| 5,997,056 | A | * | 12/1999 | Yamagishi | E05C 19/022 |
| | | | | | 292/341.17 |
| 2010/0140890 | A1 | * | 6/2010 | Boivin | B62B 3/004 |
| | | | | | 280/47.34 |
| 2011/0278879 | A1 | * | 11/2011 | Belanger | B29C 70/86 |
| | | | | | 296/187.01 |

FOREIGN PATENT DOCUMENTS

| | | |
|---|---|---|
| FR | 2 589 932 A1 | 5/1987 |
| FR | 2 749 343 A1 | 12/1997 |
| GB | 2 228 527 A | 8/1990 |

\* cited by examiner

LOCKING MECHANISM FOR A GALLEY CONTAINER AND GALLEY CONTAINER PROVIDED WITH A LOCKING MECHANISM

FIELD OF THE INVENTION

The invention relates to a locking assembly for a galley container comprising:
- a picklock arranged on a first galley container part,
- a locking mechanism arranged on a second galley container part for engaging the picklock, the first and second galley container parts being moveable towards and away from each other to close and open the galley container,
- the locking mechanism being moveable between a release position, wherein the picklock is released from the locking mechanism, and a lock position wherein the locking mechanism can engage the picklock to lock the first container part to the second container part.

BACKGROUND OF THE INVENTION

Locking assemblies as described above are known. A disadvantage of such locking assemblies is that additional force may be needed to close the door, because when closing the door, the picklock may have to push the locking mechanism from its locked position to its release position in order to allow the picklock to enter the locking mechanism. This disadvantage is in particular present in locking assemblies wherein the locking mechanism is biased towards its locked position. This is often the case because it ensures that a closed door is always locked without the need of a separate locking operation of a user.

This introduces the risk that a door is not properly closed if it was not closed with enough force by a user.

It is an object to provide a locking assembly that requires less force for locking the first galley container part to the second galley container part.

SUMMARY OF THE INVENTION

Hereto the locking assembly is characterized in that a blocking element is provided that
in a block position prevents the locking mechanism from moving to the lock position,
and in an unblock position allows the locking mechanism to move to the lock position.

The blocking element provides the advantage that the locking mechanism remains in the release position when the picklock is moved out of the locking mechanism, e.g. when the door of the galley container is open. This facilitates closing the door as the door can now reach its closed position without the need of pushing the locking mechanism from its lock position to its release position to enable the picklock to enter the locking mechanism.

In a preferred embodiment a locking assembly is provided, wherein the locking mechanism is biased towards the lock position. In such an embodiment the advantage of the blocking element is even bigger, as the locking mechanism will always be in its lock position when the picklock is not in the locking mechanism.

Another embodiment relates to a locking assembly, wherein the locking mechanism comprises a pair of locking elements that in the release position of the locking assembly are positioned away from each other and in the lock position are positioned towards each other, wherein in the block position the blocking element is positioned between these locking elements. In the release position the locking elements are positioned away from each other to allow the picklock to pass in between the locking elements. In the lock position, the locking elements are positioned relatively close to each other, to prevent the picklock from moving out of the locking mechanism.

Furthermore, a locking assembly is foreseen, wherein the blocking element is rotatable about a shaft and comprises a first part and a second part, wherein in the block position the first part is positioned in a path of the picklock for entering the locking mechanism and the second part is positioned to block the locking mechanism from moving from the release position to the lock position, wherein in the unblock position the first part is out of the path of the picklock for entering the locking mechanism and the second part is positioned to allow the locking mechanism to move to the lock position. Due to the fact that rotation of the blocking element, caused by the picklock entering the locking mechanism and pushing against the first part, and the consequent movement of the locking mechanism to the lock position, is more easily achieved than "direct" displacement of the locking elements by the picklock itself in order to allow the locking elements to lock the picklock, less force is needed for locking the first galley container part to the second galley container part. This furthermore reduces the risk of the galley container not being locked in a proper way.

Another embodiment relates to a locking assembly, wherein the blocking element is biased towards the block position. This further reduces the risk of the galley container not being properly locked, as the blocking element "favours" the block position.

Advantageously, the locking mechanism may comprise a spring element that biases the blocking element towards the block position. Such a spring element constitutes a reliable mechanical solution for biasing the blocking element towards the block position.

An embodiment relates to a locking assembly, wherein an actuator is provided on the second galley container part, that, upon actuation, moves the locking assembly from the lock position to the release position and allows the blocking element to move from the unblock position to the block position.

Another aspect relates to a galley container provided with a locking assembly. Preferably, the galley container comprises a door and the locking mechanism is arranged on the door, whereas the galley container comprises a housing and the picklock is arranged on the housing. The invention is especially suitable for locking a galley container door to a galley container housing.

In another aspect the galley container is a trolley. In this respect, "trolley" means the mobile cart used in an aircraft cabin to serve passengers during the flight, i.e. for serving food, drinks, etcetera.

BRIEF DESCRIPTION OF THE DRAWINGS

An embodiment of a locking assembly will by way of non-limiting example be described in detail with reference to the accompanying drawings. In the drawings.

DETAILED DESCRIPTION

Figure 1:
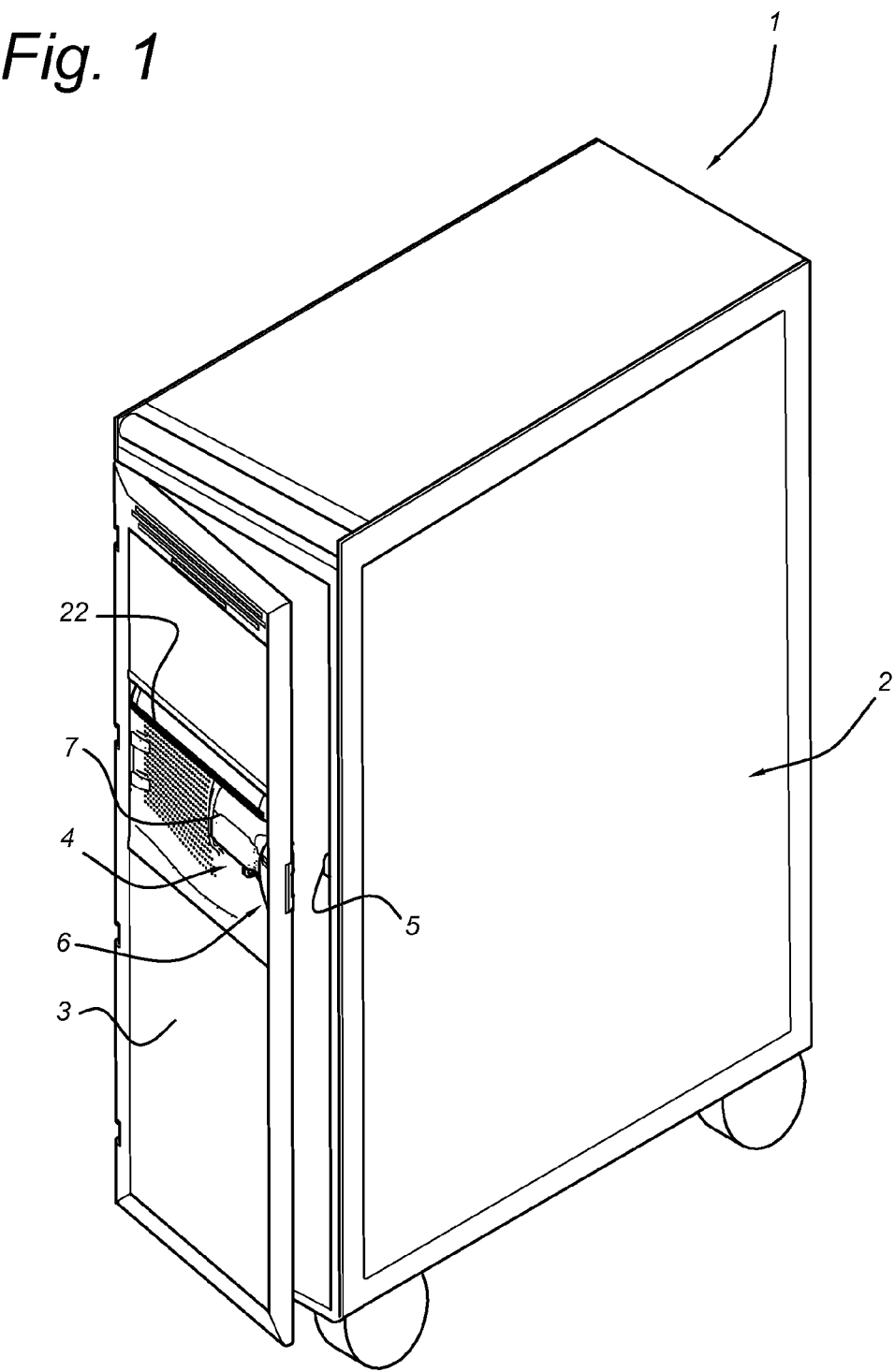
FIG. 1 shows a schematic, perspective view of an aircraft trolley with a locking assembly.

FIG. 1 shows a perspective view of a galley container in the form of an aircraft trolley 1 with a cabinet housing 2 as the second galley container part and a door 3 as the first galley container part shown in an open position wherein the trolley 1 contents can be accessed. The door 3 is moveable between an open position and a closed position. The door 3 may be connected to the cabinet housing 2 by one or more hinges provided along a hinge edge of the door 3. For reasons of safety, when the door 3 is in the closed position it should be able to withstand a crash and it should be capable of keeping the contents of the trolley 1 inside. Thereto the trolley 1 is provided with a locking assembly 4. The locking assembly 4 comprises a locking mechanism 6 provided on one of the door 3 and the cabinet housing 2 and a picklock 5 provided on the other of the door 3 and the cabinet housing 2. The locking assembly 4 is arranged to lock and unlock the door 3 when it is in the closed position. The locking mechanism 6 and the picklock 5 can engage with each other to lock the door 3.

The picklock 5 and the locking mechanism 6 are provided such that they can engage when the door is in the closed position. The locking assembly 4 as shown is provided with a picklock 5 positioned on one of vertical edges of the cabinet housing 2 adjacent to the door 3 (in closed position). The picklock 5 is constructed in such a way that it engages a locking mechanism 6 arranged on the door 3 when the door 3 is moved towards the closed position. It shall be understood that the picklock 5 can also be arranged on the door 3 while the locking mechanism 6 is arranged on the cabinet housing 2.

Furthermore, a door handle 7 is connected to the locking mechanism 6. When the door 3 is in the closed position, the door handle 7 can be operated in such a way that the locking mechanism 6 (which is engaged to the picklock 5 in the closed position) is disengaged from the picklock 5. As the skilled person will understand, when moving the door 3 from its open position towards its closed position again, the locking mechanism 6 will re-engage the picklock 5.

Additionally, the door 3 is provided with a door grip 22 for pulling or pushing the trolley 1 forwards, for example through the aisle of an aircraft.

Figure 2:
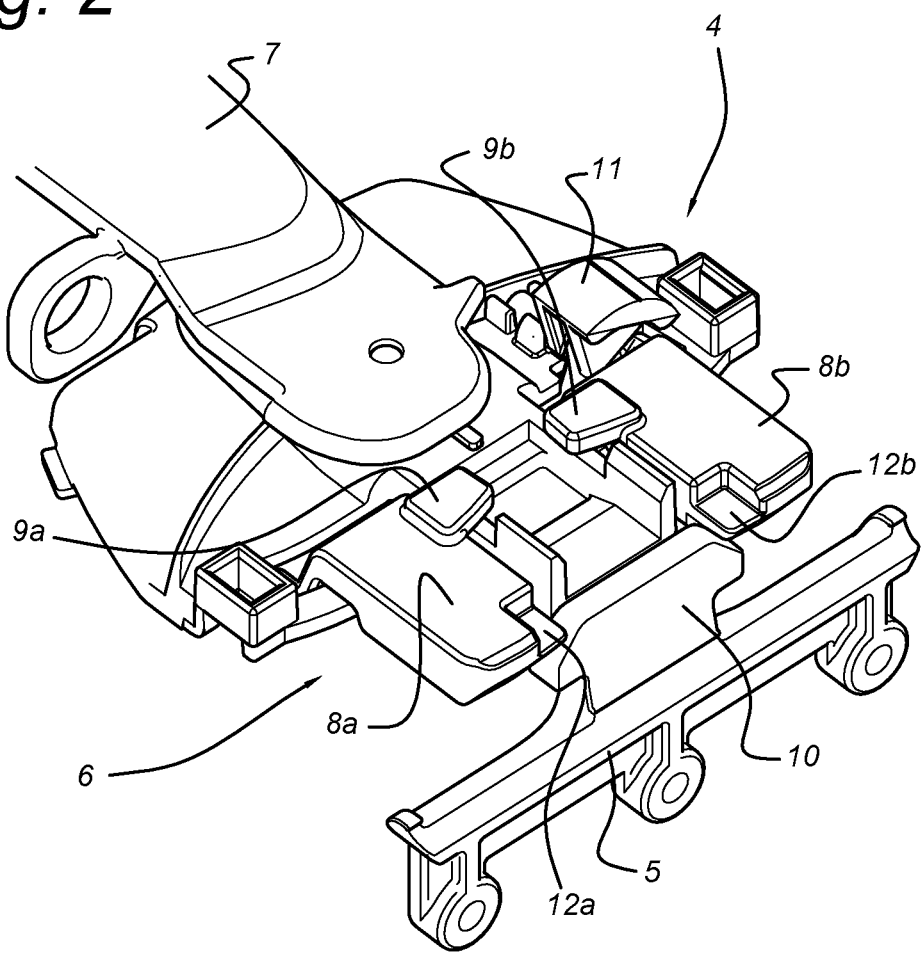
FIG. 2 shows a close-up perspective view of a prior art locking assembly.

FIG. 2 shows a close-up perspective view of a prior art locking assembly 4. For clarity, the door and the cabinet housing are not shown. A picklock 5 is shown in the lower right corner of FIG. 2. The locking mechanism 6 is shown in the upper left part of FIG. 2. In FIG. 2 the picklock 5 and the locking mechanism 6 are not engaged. The locking mechanism 6 is in the lock position, i.e. in a position wherein it can engage and lock the picklock 5. In order to actually engage the picklock 5, the picklock 5 needs to be moved towards the locking mechanism 6 (by closing the door 3), push the locking mechanism 6 to a release position to allow the picklock 5 to enter the locking mechanism 6. Once the picklock 5 entered the locking mechanism 6, the locking mechanism 6 returns to the lock position. The term release position is thus used to indicate that the picklock can move in or out of the locking mechanism. The term lock position is thus used to indicate that the picklock 5 cannot move in and out of the locking mechanism 6.

The picklock 5, that can be situated on or near one the vertical edges of the cabinet housing situated near the door of a trolley, has protrusions that can engage with the locking mechanism 6. According to the embodiment shown, this is provided by a hook-like portion or T-shaped portion 10. The protrusion comprises diagonally cut-off edges, provided to push the locking elements 8a, 8b (see below) of the locking mechanism 6 to the release position, so as to allow a smooth motion of the picklock 5 into the locking mechanism 6. The picklock 5 is furthermore provided with three holes for allowing the picklock 5 to be rigidly connected to, for example, the cabinet housing by means of screws or similar connecting means.

The locking mechanism 6 comprises two locking elements 8a, 8b designed for grabbing the hook-like portion 10 as to close the door. The locking elements 8a, 8b are biased towards moving towards the lock position, preferably in a linear fashion, as to engage the picklock 5. The corners 12a, 12b of the locking elements 8a, 8b turned towards the picklock 5 are partly cut away to allow the locking elements 8a, 8b to grab and enclose the underside of the hook-like portion 10, such that the picklock 5 can be firmly secured in the locking mechanism 6. The locking elements 8a, 8b are furthermore provided with projections 9a, 9b, whose function will be explained later. Optionally, an indicator 11 can be provided to indicate whether the locking assembly 4 is in the lock position or in the release position.

FIG. 1 and FIG. 2 relate to an prior art locking assembly 4, but it will be understood that the above explanation also applies to the locking assemblies 4 described below.

Figure 3:
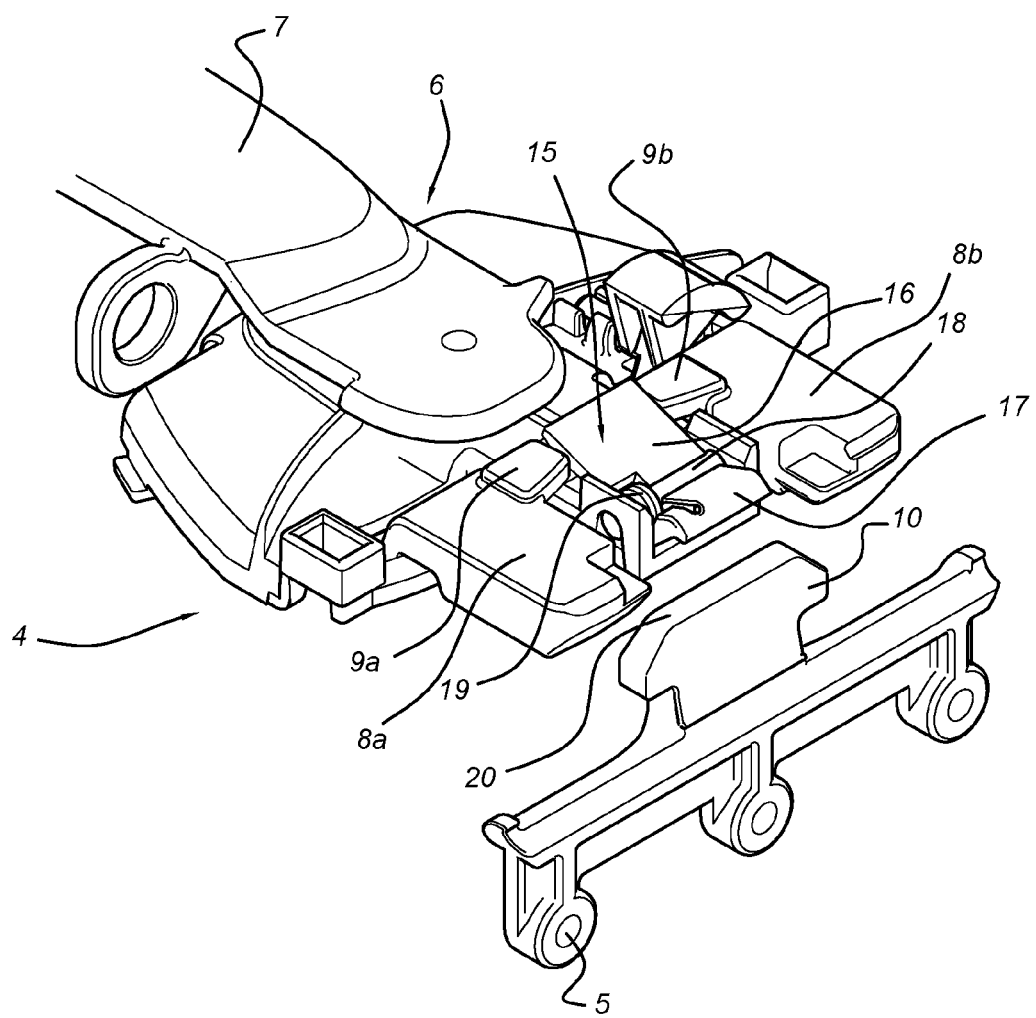
FIG. 3 shows a close-up perspective view of a locking assembly according to an embodiment.

FIG. 3 shows a close-up perspective view of a locking assembly 4 according to an embodiment. Essentially, FIG. 3 is equal to FIG. 2, but now a rotatable lip 15 is present between the projections 9a, 9b on the locking elements 8a, 8b. The lip 15 is rotatable between a block position, wherein the lip 15 blocks the locking elements 8a, 8b from further moving towards each other, and an unblock position wherein the lip 15 is rotated (by the picklock 5) out of the line of movement of the locking elements 8a, 8b. The lip 15 is provided with a spring 19 that biases the lip 15 towards rotating to the block position. Instead of a rotatable lip 15, other shapes, or in a broader sense, other configurations suitable for blocking the movement of the locking elements 8a, 8b can also be used.

The lip 15 as shown comprises a first arm 17 and a second arm 16 that are at an angle with respect to each other (so not parallel). The angle may be in the range of 90-170 degrees. The lip is rotatable about an axis (shaft 18) which runs through a contact line between the first and second arms 17, 16.

When the picklock 5 moves towards the locking mechanism 6 of the locking assembly 4 from the position shown in FIG. 3, the first arm 17 of the rotatable lip 15 is contacted and moved by a contact surface 20 of the pick-lock 5. This causes the second, opposing arm 16 of the lip 15 to rotate away from between the projections 9a, 9b, much like a lever. The lip 15 is configured in such a way that when the lip 15 unblocks the locking elements 8a, 8b, the locking elements 8a, 8b will engage the hook-like portion 10. Now the locking assembly 4 is in the lock position. The advantage of the rotatable lip 15 lies in the fact that it reduces the force required to move the picklock 5 to the locked position, since the picklock 5 is merely required to rotate the lip 15, instead of pushing the locking elements 8a, 8b apart, which requires more force. Thus, the risk of the door not properly being closed is reduced. In order to unlock the locking assembly 4 the door handle 7 is moved by rotation. Upon movement of the door handle 7 the locking elements 8a, 8b are moved away from each other, releasing the picklock 5 from the locking mechanism 6 and allowing the rotatable lip 15 to return to the block position under the influence of the spring's force.

Figure 4A:
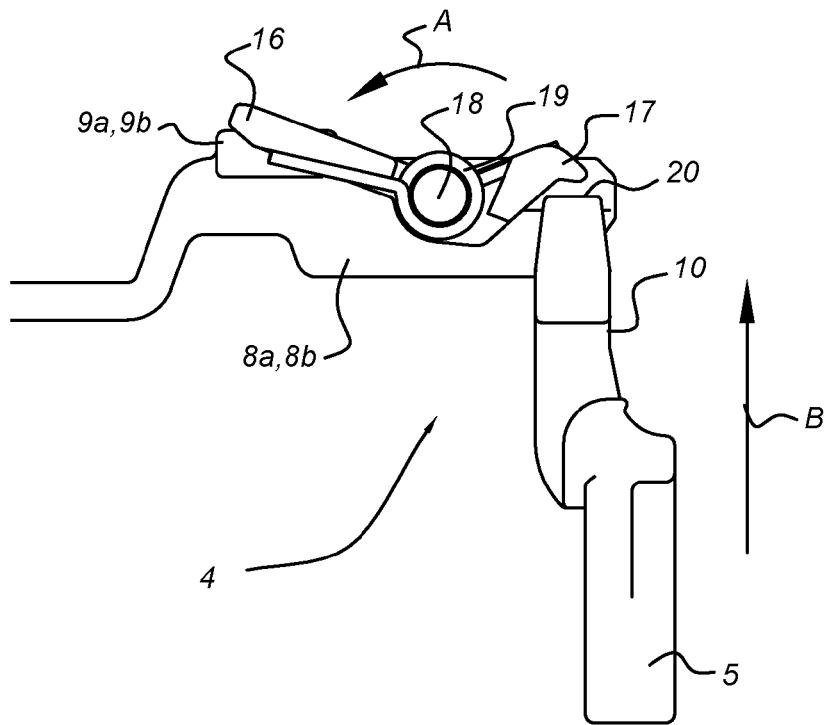
FIG. 4a shows a close-up side view of the locking assembly according to an embodiment, wherein the lip is in the block position.

FIG. 4a shows a close-up side view of the locking assembly 4, wherein the lip 15 is in the block position. As mentioned above, when the picklock 5 moves towards the first arm 17 of the rotatable lip 15, in the direction of the arrow B, the lip 15 is pushed to rotate around a shaft 18 in the direction of the arrow A in order to unblock the projections 9a, 9b and the locking elements 8a, 8b.

Figure 4B:
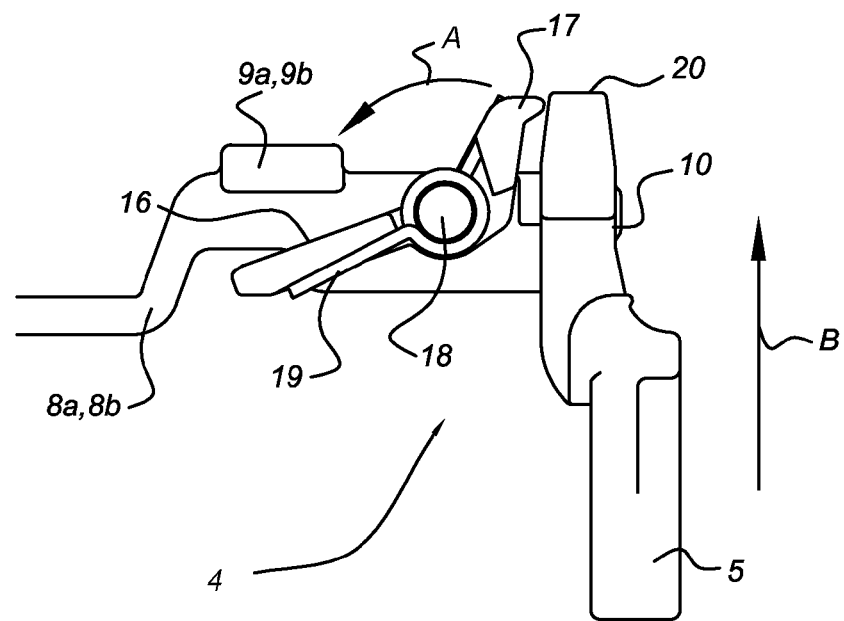
FIG. 4b shows a close-up side view of the locking assembly according to an embodiment, wherein the lip is in the unblock position.

FIG. 4b shows the result of the movement as described in FIG. 4a, the lip 15 being in the unblock position in FIG. 4b.

The invention claimed is:

1. Locking assembly for a galley container, the locking assembly comprising:
    a picklock arranged on a first galley container part,
    a locking mechanism arranged on a second galley container part for engaging the picklock, the first and second galley container parts being moveable towards and away from each other to close and open the galley container,
    the locking mechanism being moveable between a release position, wherein the picklock is released from the locking mechanism, and a lock position wherein the locking mechanism can engage the picklock to lock the first container part to the second container part,
    wherein the locking assembly comprises a blocking element that
    in a block position prevents the locking mechanism from moving to the lock position,
    and in an unblock position allows the locking mechanism to move to the lock position,
wherein the blocking element is rotatable about a shaft and comprises a first part and a second part, wherein in the block position the first part is positioned in a path of the picklock for entering the locking mechanism and the second part is positioned to block the locking mechanism from moving from the release position to the lock position, wherein in the unblock position the first part is out of the path of the picklock for entering the locking mechanism and the second part is positioned to allow the locking mechanism to move to the lock position.

2. Locking assembly according to claim 1, wherein the locking mechanism is biased towards the lock position.

3. Locking assembly according to claim 2, wherein the locking mechanism comprises a pair of locking elements that in the release position of the locking assembly are positioned away from each other and in the lock position are positioned towards each other, wherein in the block position the blocking element is positioned between these locking elements.

4. Locking assembly according to claim 2, wherein the blocking element is rotatable about a shaft and comprises a first part and a second part, wherein in the block position the first part is positioned in a path of the picklock for entering the locking mechanism from moving from the release position to the lock position, wherein in the unblock position the first part is out of the path of the picklock for entering the locking mechanism and the second part is positioned to allow the locking mechanism to move to the lock position.

5. Locking assembly according to claim 2, wherein the blocking element is biased towards the block position.

6. Locking assembly according to claim 1, wherein the locking mechanism comprises a pair of locking elements that in the release position of the locking assembly are positioned away from each other and in the lock position are positioned towards each other, wherein in the block position the blocking element is positioned between these locking elements.

7. Locking assembly according to claim 1, wherein the blocking element is biased towards the block position.

8. Locking assembly according to claim 7, wherein the locking mechanism comprises a spring element that biases the blocking element towards the block position.

9. Locking assembly according to claim 1, wherein an actuator is provided on the second galley container part, that, upon actuation, moves the locking assembly from the lock position to the release position and allows the blocking element to move from the unblock position to the block position.

10. Galley container provided with a locking assembly according to claim 1.

11. Galley container according to claim 10, wherein the galley container comprises a door and the locking mechanism is arranged on the door.

12. Galley container according to claim 11, wherein the galley container comprises a housing and the picklock is arranged on the housing.

13. Galley container according to claim 10, wherein the galley container is a trolley.

* * * * *